No. 747,743. PATENTED DEC. 22, 1903.
W. B. MARTIN.
AUTOMATIC LOCK FOR BELT TIGHTENERS.
APPLICATION FILED AUG. 29, 1903.
NO MODEL. 2 SHEETS—SHEET 1.
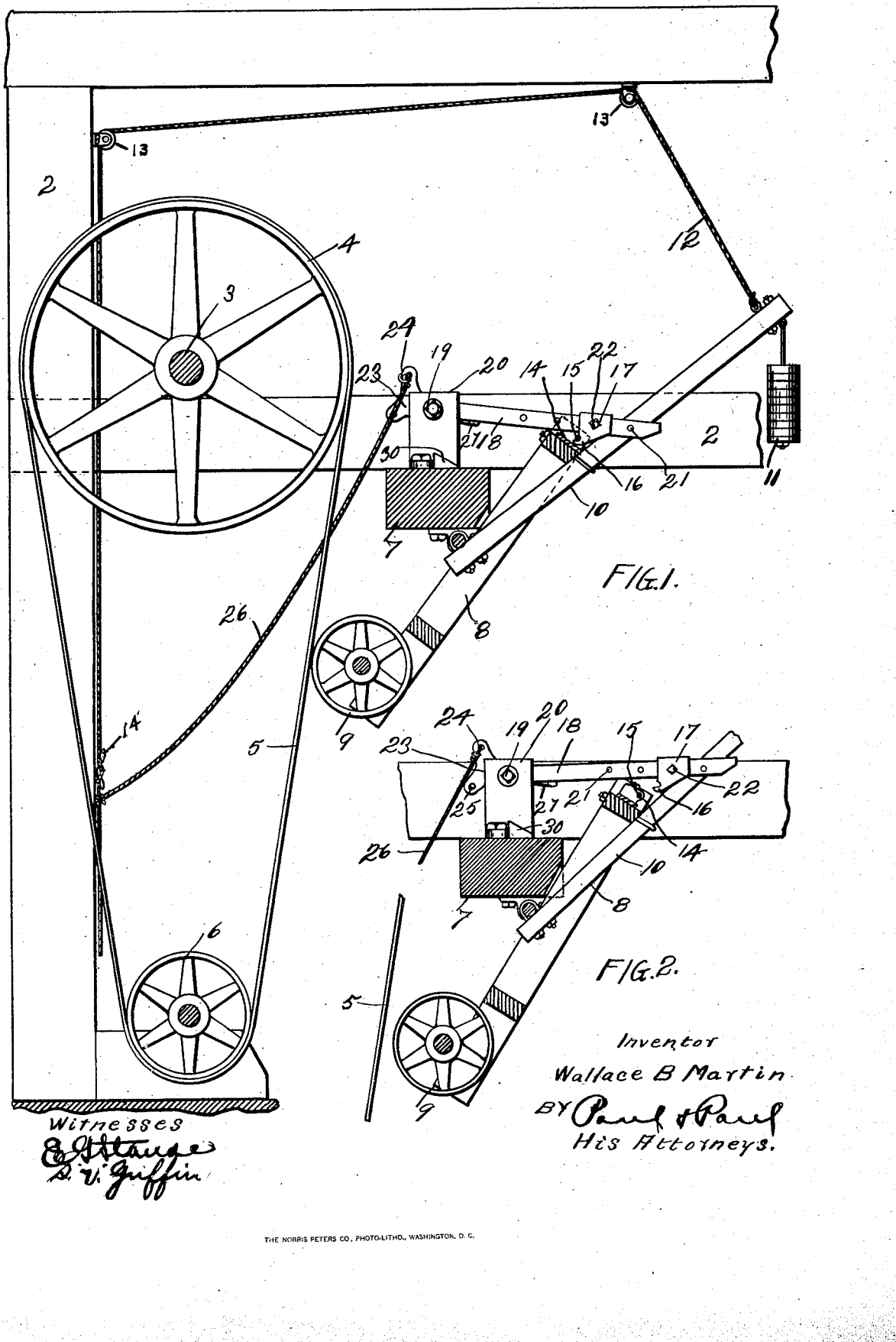
Witnesses
Inventor
Wallace B Martin
BY Paul & Paul
His Attorneys.

No. 747,743. PATENTED DEC. 22, 1903.
W. B. MARTIN.
AUTOMATIC LOCK FOR BELT TIGHTENERS.
APPLICATION FILED AUG. 29, 1903.
NO MODEL. 2 SHEETS—SHEET 2.
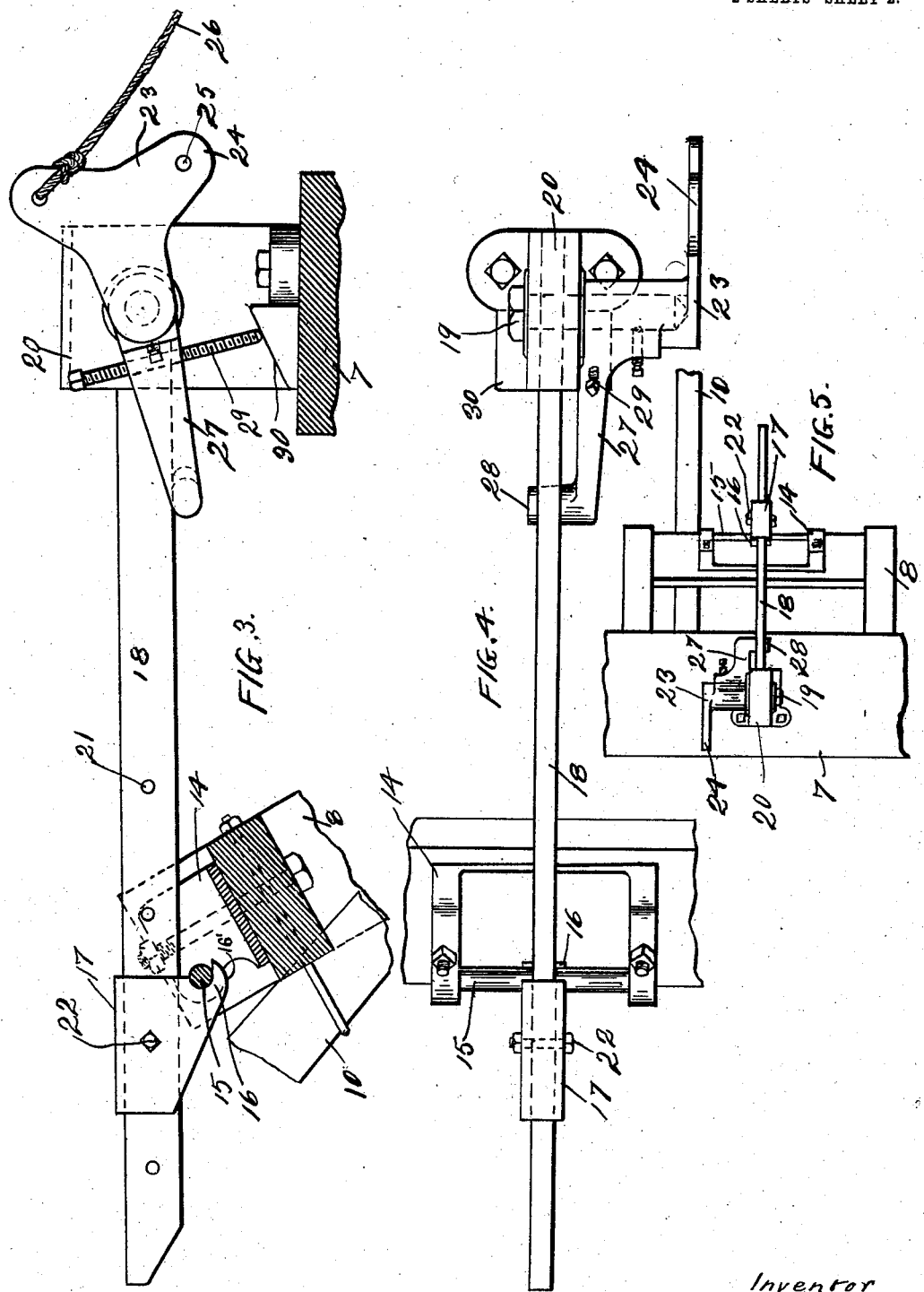
Witnesses
Inventor
Wallace B Martin
By Paul + Paul
His Attorneys.

No. 747,743.

Patented December 22, 1903.

UNITED STATES PATENT OFFICE.

WALLACE B. MARTIN, OF NICKERSON, MINNESOTA.

AUTOMATIC LOCK FOR BELT-TIGHTENERS.

SPECIFICATION forming part of Letters Patent No. 747,743, dated December 22, 1903.

Application filed August 29, 1903. Serial No. 171,184. (No model.)

*To all whom it may concern:*

Be it known that I, WALLACE B. MARTIN, of Nickerson, county of Pine, State of Minnesota, have invented certain new and useful Improvements in Automatic Locks for Belt-Tighteners, of which the following is a specification.

In the operation of a planer and other machines of similar type it is customary to suspend the belt-tightener from above and provide a rope for holding it away from the belt when the machine is not in use and a weight to swing the tightener against the belt when the rope is released to start the machine. It sometimes happens that the rope, worn by frequent use, breaks suddenly and allows the tightener to swing against the belt and start the machine when the operator is unprepared, resulting frequently in serious injury to him and damage to the machine.

The object therefore of my invention is to provide an automatic locking device which will positively prevent the tightener from becoming accidentally released and starting the machine before the operator is prepared.

Other objects of the invention will appear from the following detailed description.

The invention consists generally in various constructions and combinations, all as hereinafter described, and particularly pointed out in the claims.

In the accompanying drawings, forming part of this specification, Figure 1 is a view, partially in section, of a driven belt and tightener with my invention applied thereto. Fig. 2 is a detail view showing the lock being tripped to release the belt-tightener. Fig. 3 is a detail view showing the construction of the lock. Fig. 4 is a plan view of the same. Fig. 5 is a plan view in detail of the portion of the tightener, showing its position with respect to the lock.

In the drawings, 2 represents a suitable frame supporting the drive-shaft 3, having a pulley 4, connected by a belt 5 with a driven pulley 6. The pulley 6 is connected with the machine, which I have not thought necessary to illustrate in this application, as it forms no part of the invention.

7 is a cross-timber whereon a frame 8 is hinged at a point preferably midway between its ends and provided at its lower end with a wheel 9, that is adapted to engage the belt 5. An arm 10 is secured to the frame 8 and projects beyond the same and is provided with a weight 11, which normally tends to hold said arm in its depressed position and the wheel 9 in contact with the belt. A rope 12 is attached to the outer end of the arm 10 and passes over pulleys 13 to a point within convenient reach of the operator of the machine. A fastening device 14' is provided on the frame 2, to which the free end of the rope is secured, to hold the arm 10 in its elevated position and the wheel out of contact with the belt.

As ordinarily used the weight 11 is supported by the rope 12 when the tightener is out of contact with the belt, and it frequently happens that the rope becomes worn and breaks suddenly, allowing the weight to swing the tightener into contact with the belt and unexpectedly start the machine at a time, perhaps, when the operator is adjusting the knives or cleaning the machine and when injury to himself and damage to the machine are almost sure to result. To prevent this unexpected release of the tightener, I provide a bracket 14 on the upper end of the frame 8, having a pin 15, that is adapted to be engaged by a hook 16, having a rounded lower edge 16' on a block 17, that is slidable on a bar 18, mounted on a bolt 19, having bearings in standards 20 on the timber 7. A series of holes 21 are provided in the bar 18 to receive a bolt 22, that passes through the block 17 and allows the adjustment of said block along said bar to adapt the locking device to different positions of the tightener. A crank 23 is secured on the bolt 19 and provided with ears 24, having holes 25 to receive a cord 26, by means of which the crank is operated and the bolt 19 rocked. An arm 27 is provided on the hub of said crank and has a laterally-turned end 28, that extends under the bar 18 and engages the same to elevate it when the crank 23 is operated. A set-screw 29 is provided on the arm 27 to engage an inclined surface 30 and regulate the elevation of the bar 18.

The operation of the device is as follows: The operator desiring to stop the machine will draw down on the rope 12, raising the arm 10 and the weight 11 and swinging the wheel 9 away from the belt. As the upper end of the frame 8 is elevated the pin 15 will engage the hook 16 and slipping over the edge 16' will raise the bar 18 sufficiently to clear the hook. Then when the operator releases the rope the pin 15 will drop back into the hook 16 and the bar 18 will hold the frame 8 from tilting and prevent its lower end from swinging toward the belt. It will therefore be immaterial whether the rope 12 breaks or not. The tightener cannot operate and swing into contact with the belt to start the machine. When the operator desires to unlock the tightener and set the machine in motion, he will draw down slightly on the rope 12 to lift the tightener-frame and disengage the pin 15 from the hook 16. As soon as this has been done he will grasp the rope 26 and lift the bar 18 sufficiently so that the hook will clear the pin, when the rope 12 will be released and the tightener will swing down against the belt. The locking of the tightener is entirely automatic, and it will be impossible for the pin 15 to become disengaged from its supporting-hook until they are separated by the tilting of the tightener-frame.

I prefer to provide the crank 23 with the oppositely-extending ears 24 to adapt it for use with a tightener that is oppositely arranged from the one shown in the drawings, in which case the crank 23 and arm 27 would be turned over and the rope 26 connected to the lower ear.

This locking device is applicable for use wherever a flexible connection is provided for operating a belt-tightener from a distance and where a weight or equivalent device is used to hold the tightener when released in contact with the belt.

I claim as my invention—

1. The combination, with a driving-belt, of an oscillating frame, a wheel carried thereby, a weight tending to hold said wheel in contact with said belt, a rope connected with said frame, and adapted to support said weight and hold said wheel out of contact with said belt, means for automatically locking said frame in its retracted position, and relieving the strain on said rope and means for tripping said lock to release said frame.

2. The combination, with a driving-belt, of a reciprocating member, a wheel carried thereby, a rope connected to said member and arranged to hold said wheel out of contact with said belt, and means for automatically locking said member in its retracted position to relieve the strain upon said rope.

3. The combination, with a driving-belt, of a frame pivoted at a point intermediate to its ends, a wheel supported on said frame near one end, means tending to hold said wheel in contact with said belt, means for oscillating said frame to retract said wheel, an oscillating bar, a hook device carried thereby and arranged to engage the opposite end of said frame from said wheel and lock it in its retracted position, and means for tripping said bar to release said frame.

4. The combination, with an oscillating belt-tightener frame, of an oscillating bar, a hook mounted thereon and arranged to engage said frame, a crank, an arm carried thereby and having a laterally-turned end extending under said bar, and flexible means connected with said crank for operating said arm to lift said bar and release said frame.

5. The combination, with a driving-belt, of a reciprocating member, a wheel carried thereby, a rope connected to said member and arranged to hold said wheel out of contact with said belt, means for automatically locking said member in its retracted position to relieve the strain upon said rope, and means for tripping said locking means to release said member.

6. The combination, with an oscillating belt-tightener frame and a pin mounted thereon, of an oscillating bar, a hook carried by said bar and adapted to engage said pin and automatically lock said frame, a crank connected with said bar, a rope connected with said crank, and an arm provided on said crank and extending beneath said bar, for the purpose specified.

7. The combination, with a driving-belt, of a wheel, a reciprocating support therefor, a weight tending to hold said wheel in contact with said belt, a rope arranged to operate said support to retract said wheel and sustain said weight, an oscillating bar, a hook device carried thereby and arranged to engage said support and lock said wheel in its retracted position and relieve the strain on said rope.

8. The combination, with a driving-belt, of a frame pivoted at a point intermediate its ends, a wheel mounted on said frame near its lower end, a weight connected with the opposite end of said frame and tending to hold said wheel in contact with said belt, a rope connected with said frame and adapted to support said weight and hold said wheel in its retracted position, an oscillating bar, a hook device carried thereby and arranged to engage said frame and support it in its retracted position and relieve the strain on said rope, and a second rope connected with said bar to tilt it and trip said hook when said frame and weight are raised, substantially as described.

In witness whereof I have hereunto set my hand this 24th day of August, 1903.

WALLACE B. MARTIN.

In presence of—
JOHN M. ANDERSON,
PEDER ERICKSON.